(12) United States Patent
Fan et al.

(10) Patent No.: US 12,507,494 B2
(45) Date of Patent: Dec. 23, 2025

(54) IMAGE SENSOR MODULE

(71) Applicant: Reco BioTek Co., Ltd, Toufen (TW)

(72) Inventors: Chang Cheng Fan, Toufen (TW); Chang Meng Chih, Toufen (TW); Tsai Cheng Feng, Toufen (TW)

(73) Assignee: RECO BIOTEK CO., LTD, Toufen (TW)

( * ) Notice: Subject to any disclaimer, the term of this patent is extended or adjusted under 35 U.S.C. 154(b) by 194 days.

(21) Appl. No.: 18/203,700

(22) Filed: May 31, 2023

(65) Prior Publication Data

US 2024/0363655 A1    Oct. 31, 2024

(30) Foreign Application Priority Data

Apr. 27, 2023   (TW) .................................. 112115880

(51) Int. Cl.
*H10F 39/00* (2025.01)
*H01L 23/00* (2006.01)
(Continued)

(52) U.S. Cl.
CPC ........... *H10F 39/804* (2025.01); *H01L 24/29* (2013.01); *H01L 24/32* (2013.01); *H01L 24/45* (2013.01);
(Continued)

(58) Field of Classification Search
CPC .... H10F 39/804; H10F 39/805; H10F 39/182; H01L 24/29; H01L 24/32; H01L 24/45;
(Continued)

(56) References Cited

U.S. PATENT DOCUMENTS

| | | | |
|---|---|---|---|
| 2015/0028187 A1* | 1/2015 | Jin | ........................ H10F 39/806 |
| | | | 250/208.1 |
| 2015/0214416 A1* | 7/2015 | Ho | ........................ H10F 39/804 |
| | | | 438/65 |

(Continued)

FOREIGN PATENT DOCUMENTS

| | | |
|---|---|---|
| CN | 110854295 A | 2/2020 |
| CN | 112951855 A | 6/2021 |

(Continued)

*Primary Examiner* — Albert H Cutler
(74) *Attorney, Agent, or Firm* — Troutman Pepper Locke LLP; Tim Tingkang Xia, Esq.

(57) ABSTRACT

The present invention provides an image sensor module, including an integrated circuit substrate, an image sensing chip, a cover plate and an encapsulating material. The image sensing chip is disposed on the integrated circuit substrate. The image sensing chip includes an image sensing area and a non-image sensing area. A dam is disposed between the cover plate and the non-image sensing area of the image sensing chip. The cover plate includes a transparent material and a cushioning material. The encapsulating material covers the periphery of the image sensing chip, the periphery of the dam, part of the integrated circuit substrate and the periphery of the cover plate. The cushioning material is disposed between the transparent material and the dam and between the transparent material and the encapsulating material. The present invention reduces the possibility that the encapsulating material will peel off the cover plate.

9 Claims, 4 Drawing Sheets

(51) Int. Cl.
*H04N 23/52* (2023.01)
*H10F 39/18* (2025.01)

(52) U.S. Cl.
CPC .............. *H01L 24/48* (2013.01); *H01L 24/73* (2013.01); *H04N 23/52* (2023.01); *H10F 39/805* (2025.01); *H01L 2224/2919* (2013.01); *H01L 2224/32225* (2013.01); *H01L 2224/45124* (2013.01); *H01L 2224/45139* (2013.01); *H01L 2224/45144* (2013.01); *H01L 2224/45147* (2013.01); *H01L 2224/45166* (2013.01); *H01L 2224/4518* (2013.01); *H01L 2224/48091* (2013.01); *H01L 2224/48105* (2013.01); *H01L 2224/48227* (2013.01); *H01L 2224/73265* (2013.01); *H10F 39/182* (2025.01)

(58) Field of Classification Search
CPC . H01L 24/48; H01L 24/73; H01L 2224/2919; H01L 2224/32225; H01L 2224/45124; H01L 2224/45139; H01L 2224/45144; H01L 2224/45147; H01L 2224/45166; H01L 2224/4518; H01L 2224/48091; H01L 2224/48105; H01L 2224/48227; H01L 2224/73265; H04N 23/52
See application file for complete search history.

(56) References Cited

U.S. PATENT DOCUMENTS

| | | | |
|---|---|---|---|
| 2015/0253477 A1* | 9/2015 | Nakao | H04N 25/00 359/885 |
| 2020/0144318 A1* | 5/2020 | Hsieh | H10F 39/811 |
| 2020/0312897 A1* | 10/2020 | Hsieh | H10F 39/804 |
| 2020/0373341 A1* | 11/2020 | Jo | H01L 23/3157 |
| 2022/0115426 A1* | 4/2022 | Son | H01L 23/562 |
| 2022/0139984 A1* | 5/2022 | Cho | H10F 39/8057 257/434 |
| 2023/0117904 A1* | 4/2023 | Dobashi | H04N 23/55 348/302 |

FOREIGN PATENT DOCUMENTS

| | | |
|---|---|---|
| TW | 202013707 A | 4/2020 |
| WO | 2006101270 A1 | 9/2006 |

* cited by examiner

IMAGE SENSOR MODULE

REFERENCE

The present application claims priority to Taiwan Application Serial Number 112115880, filed Apr. 27, 2023, which is herein incorporated by reference in its entirety.

FIELD OF THE INVENTION

The present invention relates to an image sensor, and more particularly to the structural design of an image sensor module.

BACKGROUND OF THE INVENTION

An image sensor is a device configured to convert an optical signal into an analog signal. The image sensor outputs the analog signal and transmits it to an image processor. Then, the image processor converts the analog signal into a digital signal and performs other image processing (such as color correction, etc.) to obtain digital image information. Common types of image processors are charge coupled device (CCD) or complementary metal-oxide-semiconductor (CMOS).

A complementary metal-oxide-semiconductor image sensor (CMOS Image Sensor, CIS) is an image sensor based on a complementary metal-oxide-semiconductor process. In these days, CMOS image sensors are widely used in automotive, security, medical and manufacturing fields. Practical applications of the CMOS image sensors are, for example, surveillance cameras, vehicle-mounted cameras, or endoscope cameras.

The packaging of the CMOS image sensors generally adopts wire bonding technology or flip chip package (FCP) technology. The wire bonding packaging technology uses gold wires to connect the finger pads provided on the upper surface of the integrated circuit substrate and the bond pads provided on the upper surface of the image sensor chip. A cover plate is bonded on the image sensing chip to protect the image sensing area on the upper surface of the image sensing chip. The gold wires and the image sensing chips are protected by coating and encapsulating. The cover plate is fixed on the top of the image sensor. Ball grid array solder balls are arranged on the lower surface of the integrated circuit substrate to form the structure of the complementary metal-oxide-semiconductor image sensor.

Generally, the packaging using ball grid array solder balls is coated on a single chip, which has the disadvantage of being time-consuming. Therefore, the coating packaging process is changed to a single injection packaging using a mold and a molding compound, so as to overcome the time-consuming shortcoming and improve the efficiency of packaging. However, the molding compound needs to be cured in a high-temperature process, and the temperature may change during high and low temperature environmental tests. Because the coefficient of thermal expansion of the molding compound is different from the coefficient of thermal expansion of the cover plate, the mold compound on the edge of the cover plate peels off or a gap is formed between the edge of the cover plate and the molding compound. As a result, the cover plate of the CMOS image sensor is easy to fall off, which affects the product yield.

SUMMARY OF THE INVENTION

In view of the foregoing problems, the primary object of the present invention is to provide an image sensor module, comprising an integrated circuit substrate, an image sensing chip, a cover plate and an encapsulating material. The image sensing chip is disposed on an upper surface of the integrated circuit substrate. The image sensing chip includes an image sensing area and a non-image sensing area. The cover plate includes a transparent material and a cushioning material. The transparent material is disposed on top of the image sensing area of the image sensing chip. A dam is disposed between a lower surface of the cover plate and the non-image sensing area on an upper surface of the image sensing chip. The encapsulating material is configured to cover a periphery of the image sensing chip, a periphery of the dam, part of the upper surface of the integrated circuit substrate, and a periphery of the cover plate. The cushioning material is disposed between the transparent material and the dam and between the transparent material and the encapsulating material.

In one embodiment of the present invention, a plurality of finger pads are provided on the upper surface of the integrated circuit substrate, and a plurality of bond pads are provided on the image sensing chip. The plurality of finger pads and the plurality of bond pads are connected through a plurality of metal wires. The plurality of finger pads, the plurality of bond pads and the plurality of metal wires are covered by the encapsulating material.

In one embodiment of the present invention, the cushioning material is epoxy resin, silicone, acrylic resin, or polyimide (PI).

In one embodiment of the present invention, the cover plate is parallel to the image sensing chip.

In one embodiment of the present invention, a gap is formed between the lower surface of the cover plate and the upper surface of the image sensing chip.

In one embodiment of the present invention, an adhesive layer is provided between a lower surface of the image sensing chip and the upper surface of the integrated circuit substrate.

In one embodiment of the present invention, the cover plate further includes a top anti-reflective coating.

In one embodiment of the present invention, the cover plate further includes a bottom anti-reflective coating.

In one embodiment of the present invention, the cover plate further includes a top anti-reflective coating and a bottom anti-reflective coating.

In one embodiment of the present invention, a plurality of conductive elements are provided on a lower surface of the integrated circuit substrate.

DETAILED DESCRIPTION OF THE PREFERRED EMBODIMENTS

Figure 1:
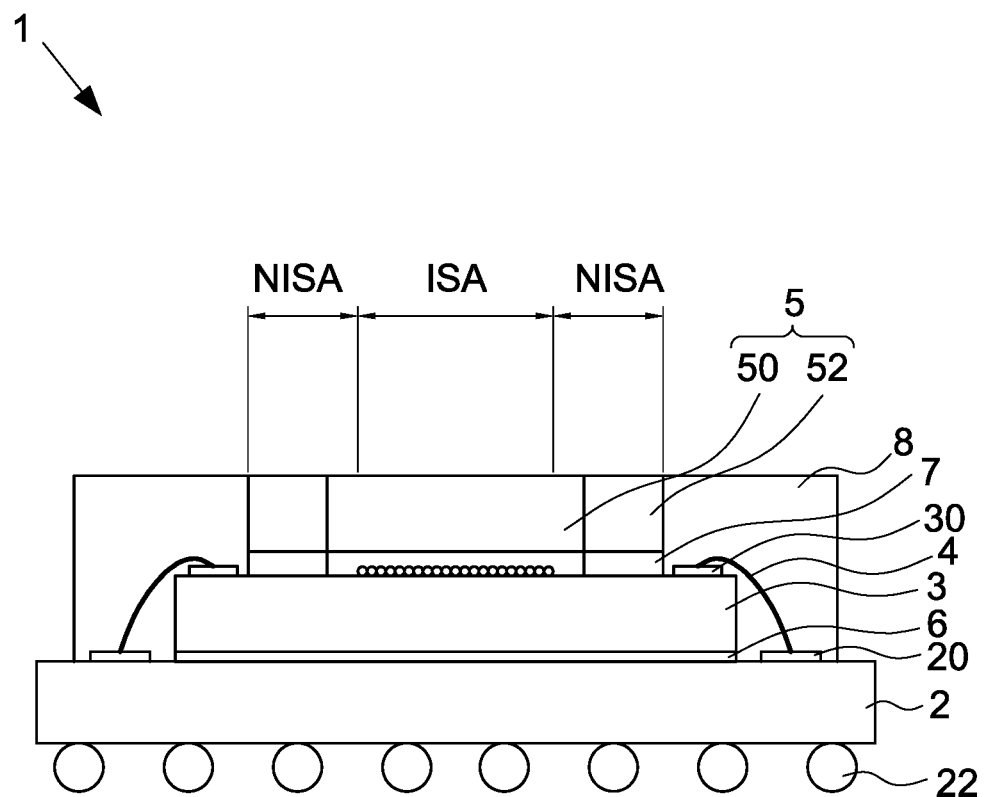
FIG. 1 is a schematic cross-sectional view of the image sensor module of the present invention, wherein the transparent material of the cover plate has a rectangle shape.

In order to make those skilled in the technical field of the present invention understand the content of the present invention easily, embodiments of the present invention will now be described, by way of example only, with reference to the accompanying drawings.

"One embodiment" described in the description means that a specific feature, structure, or characteristic is included in at least one of the embodiments. Thus, "one embodiment" set forth in the description does not necessarily refer to the same embodiment. In addition, a specific feature, structure, or characteristic may be implemented in any manner in one or more embodiments.

The "first" and "second" mentioned in the description are only for descriptive purposes and should not be understood as indicating or implying relative importance.

As shown in FIG. 1, FIG. 2, FIG. 3 and FIG. 4, the present invention provides an image sensor module 1, comprising an integrated circuit substrate 2, an image sensing chip 3, a plurality of metal wires 4, a cover plate 5 and an encapsulating material 8. A plurality of finger pads 20 are provided on the upper surface of the integrated circuit substrate 2. The image sensing chip 3 is disposed on the upper surface of the integrated circuit substrate 2. A plurality of bond pads 30 are provided on the upper surface of the image sensing chip 3. The plurality of metal wires 4 are configured to connect the plurality of finger pads 20 and the plurality of bond pads 30. The image sensing chip 3 includes an image sensing area ISA and a non-image sensing area NISA. A dam 7 is disposed between the non-image sensing area NISA on the upper surface of the image sensing chip 3 and the lower surface of the cover plate 5. The encapsulating material 8 covers the periphery of the image sensing chip 3, the periphery of the dam 7, part of the upper surface of the integrated circuit substrate 2, the plurality of metal wires 4 and the periphery of the cover plate 5. The cover plate 5 includes a transparent material 50 and a cushioning material 52. The transparent material 50 is disposed on top of the image sensing area ISA of the image sensing chip 3. The cushioning material 52 is located between the transparent material 50 and the dam 7 and between the transparent material 50 and the encapsulating material 8. The dam 7 is a supporting structure to form a gap between the lower surface of the cover plate 5 and the upper surface of the image sensing chip 3.

As shown in FIG. 1, FIG. 2, FIG. 3 and FIG. 4, the integrated circuit substrate 2 is configured to carry the image sensing chip 3, and the integrated circuit substrate 2 is equipped with metal circuits. In one embodiment of the present invention, the integrated circuit substrate 2 is an FR-4 substrate, but the actual implementation is not limited to this. The integrated circuit substrate 2 may be a substrate with metal circuits, such as bismaleimide triazine (BT) resin substrate, an Ajinomoto build-up film (ABF) substrate, a molded interconnect substrate (MIS), and the like.

Please refer to FIG. 1, FIG. 2, FIG. 3 and FIG. 4. A plurality of conductive elements 22 are connected to the lower surface of the integrated circuit substrate 2. In one embodiment of the present invention, because the integrated circuit substrate 2 is packaged in a ball grid array (BGA), the conductive elements 22 are solder balls, but the actual implementation is not limited to this. The integrated circuit substrate 2 may be packaged in other manners, such as land grid array (LGA), so the conductive elements 22 are land grid array pads (LGA pad).

Please refer to FIG. 1, FIG. 2, FIG. 3 and FIG. 4. The image sensing chip 3 is configured to convert the received optical signal into an electronic signal. In one embodiment of the present invention, the image sensing area ISA of the image sensing chip 3 is provided with a light-gathering layer, a color filter layer and a photoelectric conversion layer. The color filter layer is disposed on the upper surface of the photoelectric conversion layer. The light-gathering layer is disposed on the upper surface of the color filter layer. The light-gathering layer is composed of a plurality of micro-lenses, configured to gather light for improving the sensitivity of the image sensor. The color filter layer is a color filter. The color filter includes a plurality of sub-pixels. The sub-pixels include red sub-pixels, green sub-pixels and blue sub-pixels. The micro-lenses correspond to the sub-pixels, respectively. When the light is gathered by the micro-lenses and passes through the color filter layer, the color information of red, green and blue is provided according to the types of the sub-pixels. The light-gathering layer is composed of multiple complementary metal-oxide-semiconductors (CMOS), configured to receive color information, form light and dark information according to the intensity of light, and convert the color information and light and dark information into electronic signals to be recorded as images. The image sensing chip 3 is attached to the upper surface of the integrated circuit substrate 2 by means of an adhesive layer 6. In this embodiment, the material of the adhesive layer 6 is a thermal curing adhesive. The thermal curing adhesive is, for example, LOCTITE® ABLESTIK 2053S die attach adhesive available from Henkel KGaA.

Please refer to FIG. 1, FIG. 2, FIG. 3 and FIG. 4. The metal wires 4 are configured to connect the circuit between the image sensing chip 3 and the integrated circuit substrate 2. In one embodiment of the present invention, the metal wires 4 are gold wires, but the actual implementation is not limited to this. The metal wires 4 may be silver, copper, aluminum, molybdenum, titanium or other metal conductive wires. The metal wires 4 are not limited to a single metal material, and they may be made of an alloy material formed of the aforementioned materials. The metal wires 4 connect the finger pads 20 and the bond pads 30, serving as a path between the finger pads 20 and the bond pads 30 for transmitting electronic signals. Therefore, after the image sensing chip 3 converts optical signals into electronic signals, the bond pads 30 transmit the electronic signals to the finger pads 20 of the integrated circuit substrate 2 via the metal wires 4. The finger pads 20 transmit the electronic signal to the conductive elements 22 via the metal circuits arranged on the integrated circuit substrate 2.

Please refer to FIG. 1, FIG. 2, FIG. 3 and FIG. 4. The cover plate 5 is configured to protect the image sensing chip 3, preventing the image sensing chip 3 from being damaged by external forces, such as impact or scratches, etc. In one embodiment of the present invention, the transparent material 50 of the cover plate 5 may be glass, sapphire glass, polycarbonate (PC), poly(methyl methacrylate) (PMMA) or other transparent plates. The glass may be transparent glass, such as soda lime glass, aluminosilicate glass, borosilicate glass, alkali-free glass, crystal glass or quartz glass. In one embodiment of the present invention, the transparent material 50 is disposed on top of the image sensing area ISA of the image sensing chip 3. The projected area of the transparent material 50 is greater than or equal to the projected area of the image sensing area ISA of the image sensing chip 3. Because the transparent material 50 has a transparent property and the encapsulating material 8 only covers the periphery of the cover plate 5 and does not cover the upper surface of the transparent material 50, external light can pass through the transparent material 50 to reach the image sensing chip 3, so that the image sensing chip 3 receives the light and converts it into a corresponding electronic signal.

Please refer to FIG. 1, FIG. 2, FIG. 3 and FIG. 4. The dam 7 is disposed between the cover plate 5 and the image sensing chip 3, so that a gap is formed between the cover plate 5 and the image sensing chip 3, so as to prevent the image sensing area ISA of the image sensing chip 3 from being pressed by the cover plate 5. In one embodiment of the present invention, the cover plate 5 is parallel to the image sensing chip 3. In one embodiment of the present invention, the material of the dam 7 may be photo curing resin or thermal curing resin. The photo curing resin may be, for example, ultraviolet (UV) curing resin, but the actual implementation is not limited to this. It may be other types of photo curing resin. The thermal curing resin may be, for example, acrylic resin, but the actual implementation is not limited to this. It may be other types of thermal curing resins. The material of the dam 7 is, for example, a dam agent NAGASE® T694/UR301N2 available from NAGASE Group.

Please refer to FIG. 1, FIG. 2, FIG. 3 and FIG. 4. The encapsulating material 8 is configured to fix the cover plate 5. Moreover, the encapsulating material 8 is also configured to protect and fix the image sensing chip 3, the plurality of finger pads 20, the plurality of bond pads 30, the plurality of metal wires 4 and the metal circuits on the integrated circuit substrate 2. In one embodiment of the present invention, the encapsulating material 8 may be epoxy resin, such as bisphenol A type epoxy resin, bisphenol F type epoxy resin, phenol novolac type epoxy resin, cresol novolac type epoxy resin, aliphatic epoxy resin and other epoxy resins, but the actual implementation is not limited to this. The encapsulating material 8 may be thermal curing resins, such as silicone, acrylic resin, and polyimide (PI). The encapsulating material 8 is not limited to a single material, and may be a mixture of any two or more of the aforementioned examples of the encapsulating material 8. In addition, the encapsulating material 8 is not limited to one-component adhesive, and may be in the form of two-component adhesive. The encapsulating material is, for example, an epoxy resin encapsulating compound EME-G311QF available from Sumitomo Bakelite Co., Ltd.

Please refer to FIG. 1, FIG. 2, FIG. 3 and FIG. 4. In one embodiment of the present invention, the cushioning material 52 may be epoxy resin, such as bisphenol A type epoxy resin, bisphenol F type epoxy resin, phenol novolac type epoxy resin, cresol novolac type epoxy resin, aliphatic epoxy resin and other epoxy resins, but the actual implementation is not limited to this. The cushioning material 52 may be thermal curing resins, such as silicone, acrylic resin, and polyimide (PI). The cushioning material 52 is not limited to a single material, and may be a mixture of any two or more of the aforementioned examples of the cushioning material 52. In addition, the cushioning material 52 is not limited to one-component adhesive, and may be in the form of two-component adhesive. The cushioning material is, for example, an epoxy resin encapsulating compound EME-G311QF available from Sumitomo Bakelite Co., Ltd.

The cushioning material 52, the dam 7 and the encapsulating material 8 of the present invention are added in different preparation steps. Therefore, the cushioning material 52, the dam 7 and the encapsulating material 8 cannot be regarded as an integrally formed material completed in the same step. In the present invention, the cushioning material 52 of the cover plate 5 is disposed on the periphery of the transparent material 50 in advance, and then placed on the dam 7, and finally filled with the encapsulating material 8 to complete the packaging. The present invention utilizes the property that the coefficient of thermal expansion of the cushioning material 52 is close to or the same as that of the encapsulating material 8 to strengthen the adhesion between the cover plate 5 and the encapsulating material 8. The image sensor module 1 of the present invention can reduce the impact caused by temperature changes when performing a high-temperature curing process, such as ball mount reflow of BGA technology or performing high and low temperature environmental tests, so that the possibility of thermal expansion and contraction causing the encapsulating material 8 to peel off the cover plate 5 is reduced.

The transparent material 50 of the present invention may be in different shapes described below, in conjunction with FIG. 1, FIG. 2 and FIG. 3.

Please refer to FIG. 1. FIG. 1 is a schematic cross-sectional view of the image sensor module 1 of the present invention. The transparent material 50 of the cover plate 5 has a rectangle shape. The cushioning material 52 covers the periphery of the transparent material 50. Therefore, as shown in FIG. 1, the cushioning material 52 is located at both ends of the transparent material 50, and the cushioning material 52 is located between the transparent material 50 and the dam 7 and between the transparent material 50 and the encapsulating material 8.

Figure 2:
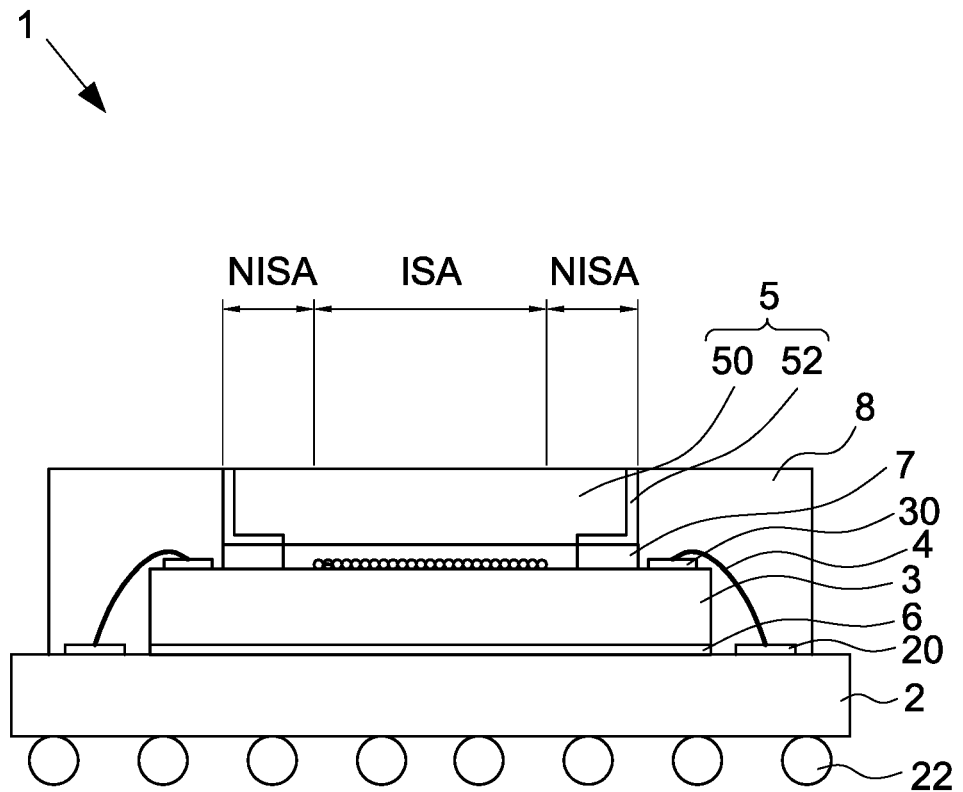
FIG. 2 is a schematic cross-sectional view of the image sensor module of the present invention, wherein the transparent material of the cover plate is T-shaped.

Please refer to FIG. 2. FIG. 2 is a schematic cross-sectional view of the image sensor module 1 of the present invention. The transparent material 50 of the cover plate 5 is T-shaped. The cushioning material 52 covers the periphery of the transparent material 50. Therefore, as shown in FIG. 2, the cushioning material 52 is located at both ends of the transparent material 50, and the cushioning material 52 is located between the transparent material 50 and the dam 7 and between the transparent material 50 and the encapsulating material 8.

Figure 3:
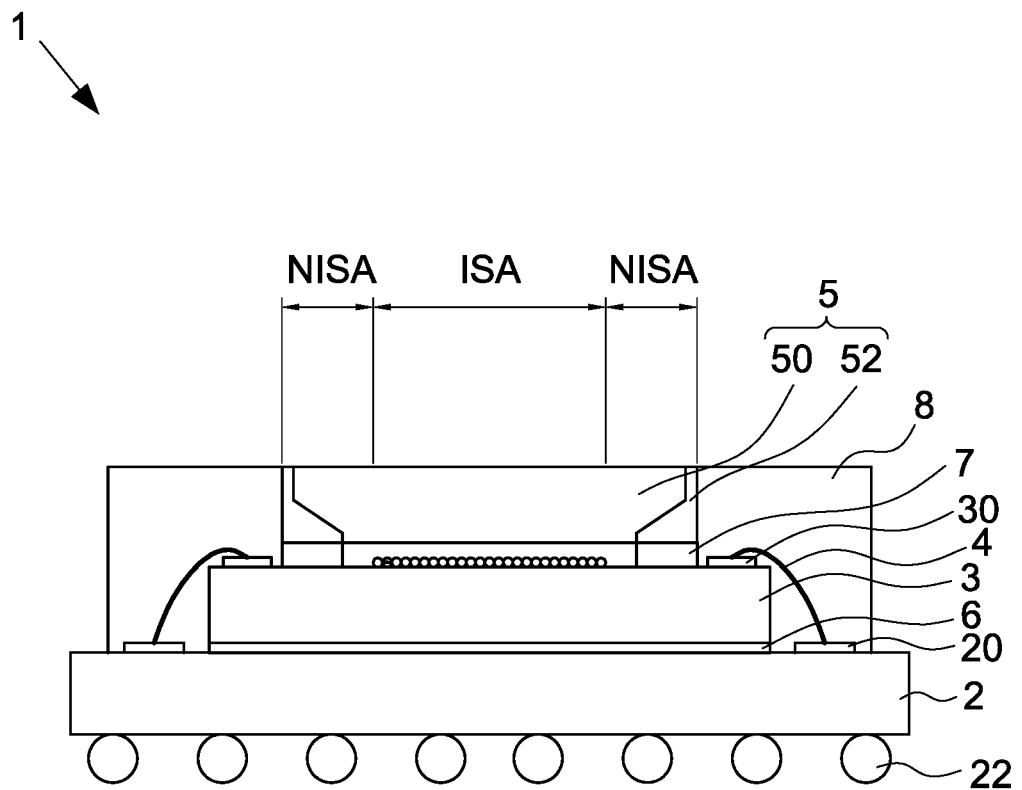
FIG. 3 is a schematic cross-sectional view of the image sensor module of the present invention, wherein the transparent material of the cover plate has a funnel shape.

Please refer to FIG. 3. FIG. 3 is a schematic cross-sectional view of the image sensor module 1 of the present invention. The transparent material 50 of the cover plate 5 has a funnel shape, which is wide at the top and narrow at the bottom. Both the lower left side and the lower right side of the transparent material 50 are bevels. Therefore, as shown in FIG. 3, the cushioning material 52 is located at both ends of the transparent material 50, and the cushioning material 52 is located between the transparent material 50 and the dam 7 and between the transparent material 50 and the encapsulating material 8.

The foregoing is examples of the cover plate 5 of the present invention, and the cover plate 5 is not limited to the examples.

Figure 4:
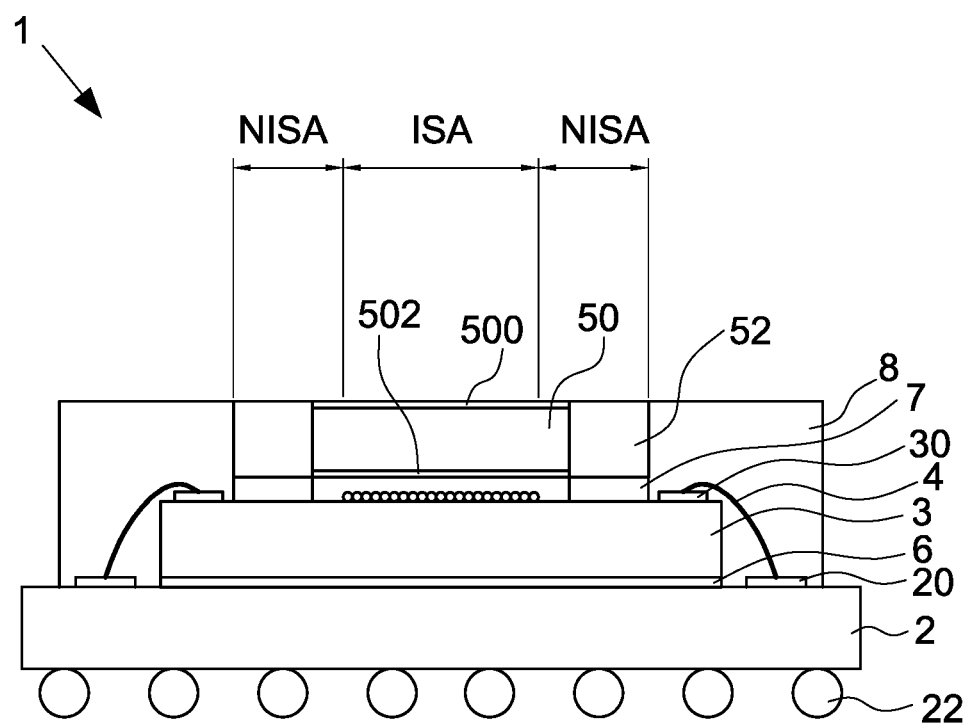
FIG. 4 is a schematic cross-sectional view of the image sensor module of the present invention, wherein the upper surface and the lower surface of the transparent material of the cover plate are provided with the first anti-reflective layer and the second anti-reflective layer, respectively.

Please refer to FIG. 4. In one embodiment of the present invention, the cover plate 5 further includes an anti-reflective coating. The anti-reflective layer is disposed on the surface of the transparent material 50, and may be a single-sided anti-reflective layer or a double-sided anti-reflective layer. The anti-reflective layer is configured to reduce the light reflection of the transparent material 50 and reduce the loss of light passing through the transparent material 50, so as to increase the light transmittance of the transparent material 50 and improve the image quality. In this embodiment, the cover plate 5 has double-sided anti-reflective layer. The anti-reflective layer includes a first anti-reflective layer 500 and a second anti-reflective layer 502. The first anti-reflective coating 500 is disposed on the upper surface of the transparent material 50 and represents a top anti-reflective coating (TARC). The second anti-reflective coating 502 is disposed on the lower surface of the transparent material 50 and represents a bottom anti-reflective coating (BARC). The first anti-reflective layer 500 and the second anti-reflective layer 502 reduce the light reflection of the transparent material 50 together, thereby improving the image quality, but the actual implementation is not limited to this. The cover plate 5 may have a single-sided anti-reflective layer, such as only the first anti-reflective layer 500 or only the second anti-reflective layer 502, that is, the anti-reflective layer is only arranged on the upper surface of the transparent material 50 or on the lower surface of the transparent material 50.

Please refer to FIG. 1, FIG. 2, FIG. 3 and FIG. 4. The present invention not only saves the amount of the cushioning material 52 but also reduces the cost by providing the cushioning material 52 between the transparent material 50 and the dam 7 and between the transparent material 50 and the encapsulating material 8. With the arrangement of the cushioning material 52, the cover plate 5 is not easily affected by high-temperature curing process and temperature changes during high and low temperature environmental tests, thereby reducing the cover plate 5 to fall off and improving the production yield of the image sensor module 1.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An image sensor module, comprising:
an integrated circuit substrate;
an image sensing chip, disposed on an upper surface of the integrated circuit substrate, the image sensing chip including an image sensing area and a non-image sensing area;
a cover plate, including a transparent material and a cushioning material, the transparent material being disposed on top of the image sensing area of the image sensing chip, a dam being disposed between a lower surface of the cover plate and the non-image sensing area on an upper surface of the image sensing chip;
an encapsulating material, configured to cover a periphery of the image sensing chip, a periphery of the dam, part of the upper surface of the integrated circuit substrate, and a periphery of the cover plate;
wherein the cushioning material is disposed between the transparent material and the dam, the cushioning material is disposed between the transparent material and the encapsulating material along a first direction, the cushioning material has two opposite sides along the first direction, the two opposite sides of the cushioning material respectively contact the transparent material and the encapsulating material and does not contact the dam, and wherein the cushioning material is silicone, acrylic resin, or polyimide; and
wherein a coefficient of thermal expansion of the cushioning material is substantially identical to a coefficient of the encapsulating material.

2. The image sensor module as claimed in claim 1, wherein a plurality of finger pads are provided on the upper surface of the integrated circuit substrate, a plurality of bond pads are provided on the image sensing chip, the plurality of finger pads and the plurality of bond pads are connected through a plurality of metal wires; wherein the plurality of finger pads, the plurality of bond pads and the plurality of metal wires are covered by the encapsulating material.

3. The image sensor module as claimed in claim 1, wherein the cover plate is parallel to the image sensing chip.

4. The image sensor module as claimed in claim 1, wherein a gap is formed between the lower surface of the cover plate and the upper surface of the image sensing chip.

5. The image sensor module as claimed in claim 1, wherein an adhesive layer is provided between a lower surface of the image sensing chip and the upper surface of the integrated circuit substrate.

6. The image sensor module as claimed in claim 1, wherein the cover plate further includes a top anti-reflective coating.

7. The image sensor module as claimed in claim 1, wherein the cover plate further includes a bottom anti-reflective coating.

8. The image sensor module as claimed in claim 1, wherein the cover plate further includes a top anti-reflective coating and a bottom anti-reflective coating.

9. The image sensor module as claimed in claim 1, wherein a plurality of conductive elements are provided on a lower surface of the integrated circuit substrate.

* * * * *